United States Patent [19]

Heisinger

[11] Patent Number: 4,710,846

[45] Date of Patent: Dec. 1, 1987

[54] MODULAR PROTECTOR FOR TELECOMMUNICATIONS EQUIPMENT

[75] Inventor: Robert F. Heisinger, Parsippany-Troy Hills Township, Morris County, N.J.

[73] Assignee: American Telephone and Telegraph Company AT&T Bell Laboratories, Murray Hill, N.J.

[21] Appl. No.: 40,709

[22] Filed: Apr. 15, 1987

Related U.S. Application Data

[63] Continuation of Ser. No. 776,484, Sep. 16, 1985, abandoned.

[51] Int. Cl.⁴ .................... H02H 3/22
[52] U.S. Cl. .................... 361/119; 361/124
[58] Field of Search .................... 361/117-119, 361/124, 129

[56] References Cited

U.S. PATENT DOCUMENTS

| | | | |
|---|---|---|---|
| Re. 30,724 | 8/1981 | Klayum et al. | 361/119 |
| 2,923,849 | 2/1960 | Rees | 361/119 X |
| 3,849,750 | 11/1974 | Baumbach et al. | 361/119 |
| 3,886,408 | 5/1975 | Klayum et al. | 361/119 |
| 4,037,266 | 7/1977 | English et al. | 361/120 |
| 4,071,876 | 1/1978 | Benson et al. | 361/119 |
| 4,133,019 | 1/1979 | Roach et al. | 361/124 |
| 4,159,500 | 6/1979 | Baumbach et al. | 361/119 |
| 4,175,277 | 11/1979 | Zuk | 361/119 |
| 4,212,047 | 7/1980 | Napiorkowski | 361/124 |
| 4,345,294 | 8/1982 | Forberg et al. | 361/119 |
| 4,351,015 | 9/1982 | Smith | 361/119 |
| 4,447,848 | 5/1984 | Smith | 361/119 |
| 4,506,310 | 3/1985 | Schwarz | 361/124 X |

OTHER PUBLICATIONS

TII Industries, Inc., brochures TII 325, TII 326, TII 355L, TII 356L, all dated 5/83 and all relevant to modular protectors.

TII Industries, Inc., brochures TII 530 and TII 531 are dated 5/84 and are relevant to modular protectors.

*Primary Examiner*—J. R. Scott
*Assistant Examiner*—A. Jonathan Wysocki
*Attorney, Agent, or Firm*—Jack S. Cubert

[57] ABSTRACT

An adaptor terminates one or more modular protectors of the same size obviating the need for a telephone company to carry an inventory of many different sizes. Each modular unit, which protects a telephone line, has a hollow shell into which two terminals are received, each terminal communicating with a protector. The terminals are elevated above a landing on the housing so that the distance between the two terminals exceed a predetermined distance to reduce noise. The protectors are enclosed within the hollow shell by a base cover which is secured in place by a grounding clip which has many tines on one end for penetrating the side of the housing; the other end of the grounding clip is so formed as to secure the housing to the adaptor.

24 Claims, 11 Drawing Figures

MODULAR PROTECTOR FOR TELECOMMUNICATIONS EQUIPMENT

This application is a continuation of application Ser. No. 776,484, filed Sept. 16, 1985, now abandoned.

TECHNICAL FIELD

This invention relates to devices for protecting telecommunications equipment from spurious voltages and spurious currents which may be present in a telephone line.

BACKGROUND OF THE INVENTION

Devices for protecting telecommunications equipment against spurious voltages and spurious currents are generally called station protectors and are well known in the art. Most station protectors are made either singly, in two's, or other combinations, requiring a telephone company to keep a large inventory. It is desirable to have a modular protector so that only one type of protector need be made which, however, may be added to meet demand.

One such modular protector is manufactured by the TII Industries, Inc. and disclosed in U.S. Pat. No. 4,212,047. It is desirable to have a truly modular protector which may be assembled within any existing enclosure when used outdoors or without an enclosure when used indoors.

SUMMARY OF THE INVENTION

In accordance with one embodiment of the present invention, there is disclosed a modular protector comprising an adapter capable of securing one or more modular protectors.

The modular protector comprises a housing having an open base and a closed end separated by two wells. Each well has an aperture through an end that is elevated above a landing at the closed end for receiving a knurled shoulder of a terminal therethrough so as to form a substantially air tight seal. Communicating with a base of the terminal in each well are in series, a low melting temperature alloy pellet, a grounding can, protector and a volute spring. A base cup which is received within a trough in the base and substantially covers the open base retains the aforesaid volute spring, grounding can, pellet protector, and terminal within each well. In the preferred embodiment, there are two terminals to terminate the tip and ring conductors of the telephone drop wire and the tip and ring conductors of the telecommunications equipment.

The base cup is retained in position by one end of a grounding clip which has a plurality of tines perforating opposite sides of the housing wall near the open base. The other end of the grounding clip is provided with means for securing the modular protector to a binding post of the adaptor.

Potting compound which is used to seal the base of the modular protector is prevented at the trough from entering the protector by a pocket of air trapped within the housing so that the movement of parts therewithin is not inhibited.

In one type of adaptor, one or two modular protectors may be secured thereto. This type of adaptor comprises an elevated central section between two flanges. The flanges have apertures for screws, or the like, to be introduced therethrough for securing the adapter to a support such as an enclosure when used outside a building or to a wall when used inside a building.

Another type of adapter is elongated and metallic, has an elevated central section and two substantially vertical sides. The adapter has several apertures for housing binding posts, each of which secures up to two of the aforesaid modular protectors. The adapter is connected to ground potential via a good conductor. The adapter may be mounted directly on a wall when used indoors or housed within an enclosure when used outdoors.

An important advantage of this novel protector results when it becomes defective and needs to be replaced. At that time, the telephone line must be disconnected before the protector can be replaced. During the period of replacement, both the line and the service wires are left open, temporarily without service but safe from spurious voltages and spurious currents.

DETAILED DESCRIPTION

Figures 1, 2:
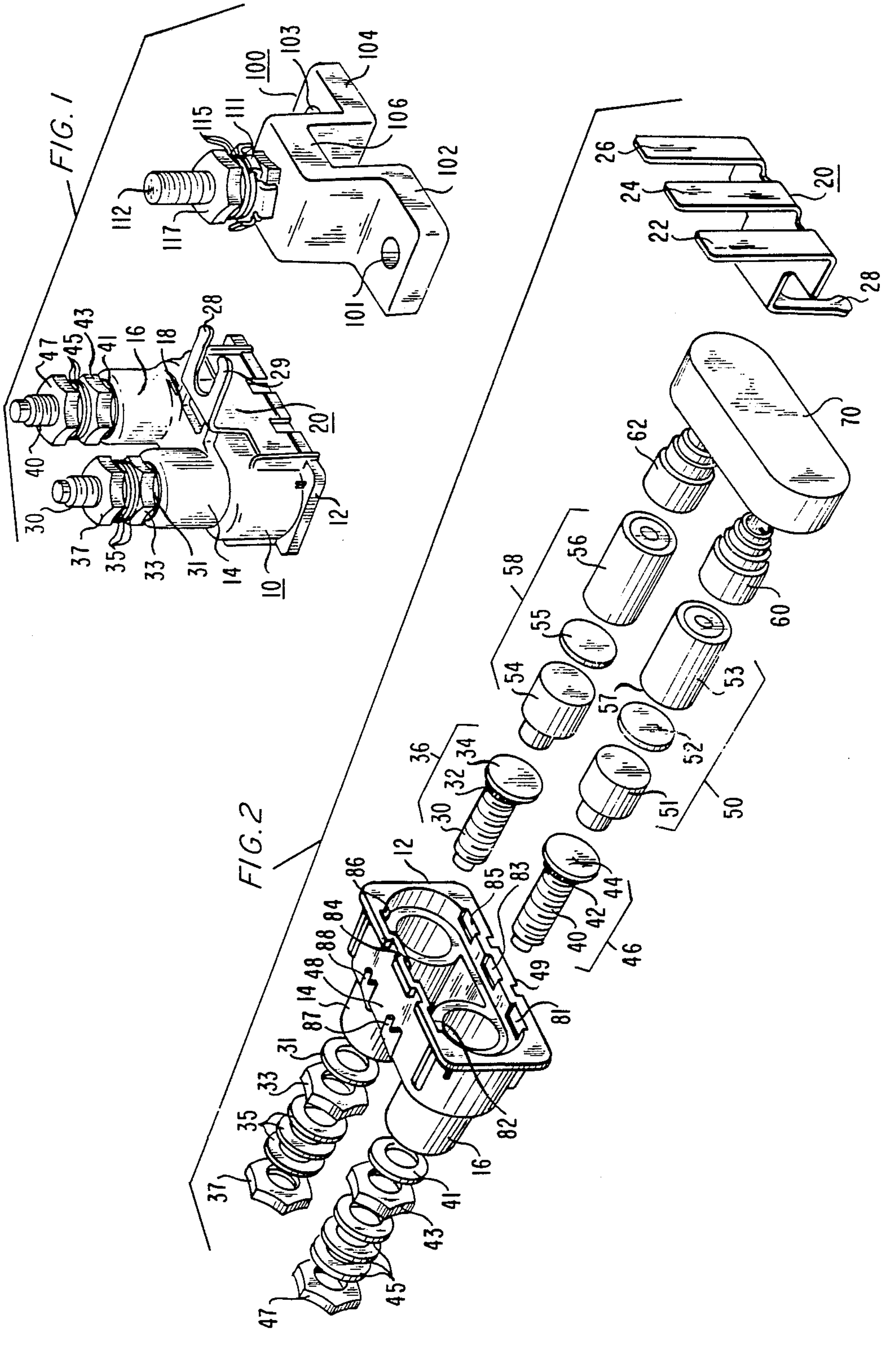
FIG. 1 shows a modular protector and an adaptor for securing the protector.
FIG. 2 shows an exploded view of the modular protector of FIG. 1.

Referring to FIG. 1, there is shown a protector module 10 and an adaptor 100. Adaptor 100 has a central section 106 elevated above two flanges 102 and 104, having respectively, openings 101 and 103, through which means, such as a screw, may be inserted for fastening the adaptor to a support.

Central section 106 of adaptor 100, which is fabricated by molding a durable, high strength plastic, such as polypropylene, has an opening, not shown in FIG. 1, through which a binding post is inserted by a press fit so that threaded shank 112 projects outwardly. The binding post, which is made from brass, is prevented from turning with respect to adaptor 100 by some suitable means such as providing the binding post with a square head which is housed within a square recess in adaptor 100, or by providing the binding post with a knurled shoulder which fits tightly within the aforesaid opening of the central section 106.

A brass nut 111 is provided for securing either one or two protector modules, such as protector module 10, to the central section 106 of adaptor 100. A ground conductor, such as element 121 of FIG. 9 hereinbelow, a pronged brass washer 113, a ground connector 20 and a plurality of brass washers 115 are secured by a brass nut 117 to shank 112 as shown in FIG. 1. An advantage of this invention results from there being no special tool needed to install a protector module or adaptor.

Referring to FIGS. 1 and 2 concurrently, there is shown protector module 10 comprising a housing shell having an open base 12 and a landing 18. The housing is fabricated by injection molding of a yellow, glass filled polybutylene terephthalate (pbt), an engineering thermal plastic. This plastic has properties which provide for rugged use because of high impact characteristics, low fire hazards because of a high melting point, and because of its light color, good visibility in areas with poor lighting. Furthermore, pbt lends itself to high production rates. Also, pbt is non-corrosive to associated metallic parts. Projecting from base 12 and beyond landing 18 are two wells 14 and 16. Brass terminals 36 and 46 have, respectively, threaded shanks 30 and 40, knurled shoulders 32 and 42, and substantially flat heads 34 and 44. Terminals 36 and 46 are inserted within wells 14 and 16, respectively, through open base 12 so that shanks 30 and 40 project through openings in the wells. One distinct advantage of protector module 10 is its small size and light weight. In the preferred embodiment, the protector module measures substantially 1.40 inches by 1.30 inches by 1.60 inches. The protector module weighs about 1.25 ounces.

Figure 9:
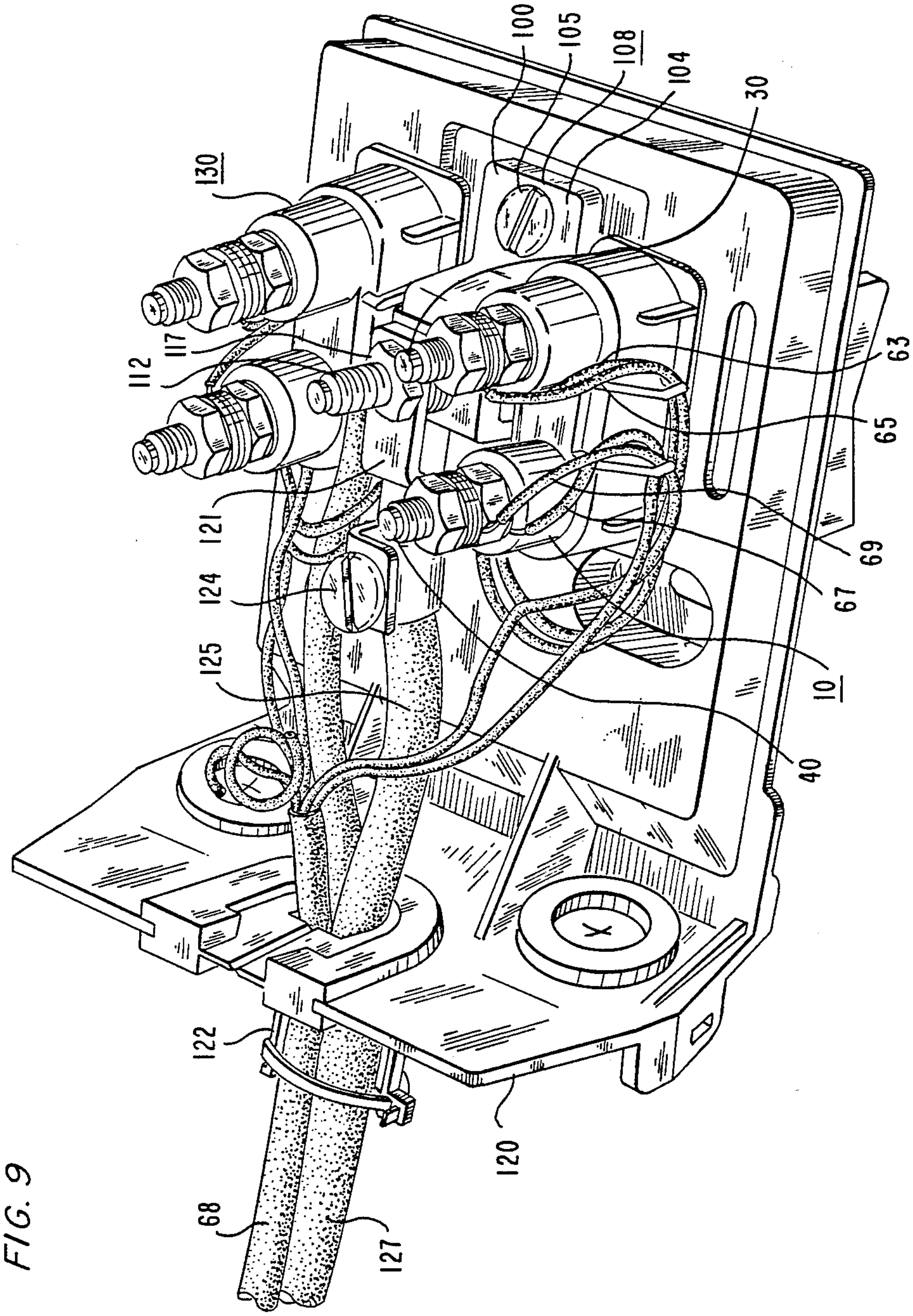
FIG. 9 shows an assembly having two protector modules.

Referring briefly to FIG. 9, there are shown tip conductors 63 and 65 connected to terminal 36 and ring conductors 67 and 69 connected to terminal 46. Referring to FIGS. 1 and 2 again, there are shown nut 33 and washer 31 for securing a conductor, either tip or ring, from a telephone drop line, sometimes referred to as a service wire, to terminal 36. Washers 35 and nut 37 are used to secure to terminal 36 one or more house conductors, sometimes referred to as station wiring, either tip or ring, corresponding to the service conductor. By this means, station wiring may be disconnected without disturbing the service conductors. If protector module 10 is to be disconnected, however, both house wiring and service wiring must be disconnected so that the service will be disconnected to the station equipment (not shown). Likewise, washer 41 and nut 43 secure a service conductor, either tip or ring, to terminal 46. Washers 45 and nut 47 secure one or more house conductors, corresponding to the service conductor, to terminal 46. Washers 31, 35, 41, 45 and nuts 33, 37, 43 and 47 are made from brass in the preferred embodiment. The house conductors referred to hereinabove are the wires which connect the telecommunications equipment with terminals 36 and 46.

Protector units 50 and 58 are inserted into wells 16 and 14 to communicate with terminal heads 44 and 34. Protector unit 50, which is illustrative of protector unit 58, comprises protector 51, pellet 52 and cup 53. Protector 51, in the preferred embodiment, is a gas tube having a gap of about three mils, such as the one disclosed in U.S. Pat. No. 4,037,266, issued July 19, 1977 to Mr. J. H. English et al, and in U.S. Pat. No. 4,175,277 issued Nov. 20, 1979 to Mr. Paul Zuk. This permits lightning strikes to flow therethrough by arcing over the three mil gap, and then to ground, momentarily, without melting alloy pellets 52 and 55. Pellets 52 and 55 are fabricated from an alloy having a low melting temperature. Cups 53 and 56 are drawn from brass. Cup 56, which is illustrative of cup 53, holds pellet 52 and protector 51 therewithin by folding edge 57 of the open end inwards.

Volute springs 60 and 62 are then inserted into wells 16 and 14 respectively. These springs are fabricated from beryllium copper which has a high conductivity. Volute springs are used because they have a larger cross section providing a greater current carrying capacity than other springs. Base cup 70, made from yellow brass, is then inserted over volute springs 60 and 62 which communicate with protector units 50 and 58 respectively. Base cup 70 fits snugly within open base 12 and is kept therein by ground clip 20. Base cup 70 functions also to provide a path to ground.

Wall 48 of the housing comprises a plurality of apertures 82, 84 and 86 near open base 12. Likewise, wall 49 of the housing comprises a plurality of apertures 81, 83 and 85. Tines 22, 24 and 26 of ground clip 20 penetrate apertures 81, 83 and 85, pass over base cup 70 and penetrate apertures 82, 84, and 86 within wall 48. By this means cup 70 retains the aforesaid volute springs, protector units and the terminals securely within the wells. Because of the aforesaid pbt material, the housing yields by deforming slightly when the aforesaid tines 22, 24 and 26 of ground clip 20 penetrate apertures 81 through 86 of walls 48 and 49 near open base 12, providing thereby a tight seal between housing and tines. As a result of this tight seal, when potting compound is poured into open base 12, over base cup 70 and tines 22, 24 and 26, the potting compound will not leak through apertures 81 through 86.

Wall 48 of the housing also has a plurality of hooks or catches 87 and 88 for dressing the conductors which are terminated at terminals 46 and 36 away therefrom. This function is also called wire trimming. When the conductors are so secured, they will not be allowed to interfere with the normal operation of the apparatus, such as avoiding short circuiting and the like.

Tines 22, 24 and 26 are connected together at a base of ground clip 20, which is made of a good electrical conductor such as yellow brass, and bent so that the clip is substantially parallel to wall 49. At about the level of landing 18, ground clip 20 is bent again substantially parallel to landing 18 and bifurcated into forks 28 and 29. Forks 28 and 29 are useful to secure ground clip 20 and thereby the protector module to binding post 112 with the aid of nut 111.

Referring to FIGS. 1, 2 and 9, should a spurious voltage appear in the conductor terminated at terminal 36 of protector module 10 for any sustained period, current will flow from terminal 36 to protector unit 58 and the heat generated from protector 54 will cause pellet 55 to melt, immediately causing volute spring 62 to force cup 56 of protector unit 58 to make contact with base 34 of terminal 36 and providing a direct path to ground via base cup 70, ground clip 20, and binding post 112 of adaptor 100. Likewise, spurious voltages are conveyed to ground via terminal 46. In the preferred embodiment, the protectors 51 and 54 are adapted to conduct when voltages exceed about 300 Volts. This threshold could be varied for different applications.

Modular protector 10, illustrative of the others, also provides a solid metallic grounding path for sustained fault currents through terminal 36 or 46, protector 58 or 50, volute spring 62 or 60, base cup 70, ground clip 20, binding post 112, and then to ground potential. Essentially, the path is provided by a thermal link, pellet 55 or 52, which senses heat being dissipated by protector 54 or 51. After pellet 55 or 52 melts, cup 56 or 53 is urged against terminal base 34 or 44, by volute spring 62, or 60, causing current to flow therethrough to cup 70 and then through ground clip 20 to binding post 112 and to ground potential.

Figure 3:
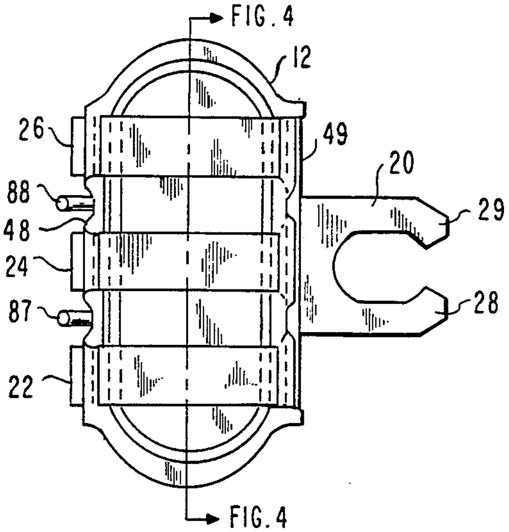
FIGS. 3 through 8 show different views and sections of the modular protector of FIG. 1.

Referring to FIG. 3, there is shown the plan view of protector module 10 viewed from open base 12 with ground clip 20 in place. Tines 22, 24 and 26 of ground clip 20 penetrate apertures 81, 83 and 85 through wall 49, pass over cup 70 and then penetrate apertures 82, 84 and 86 through wall 48. Tines 22, 24 and 26 fit tightly within apertures 81 through 86. Thereafter, a potting compound is poured over the tines of ground clip 20 and base cup 70 within open base 12 to seal the protector module from damage caused by moisture and other contaminants.

Figure 4:
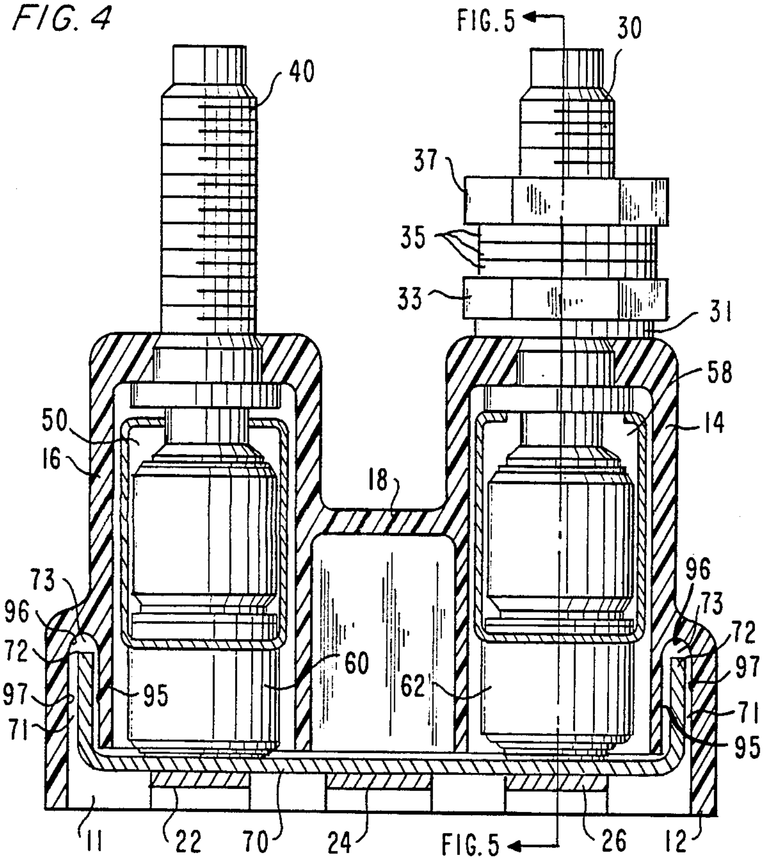
Figure 5:
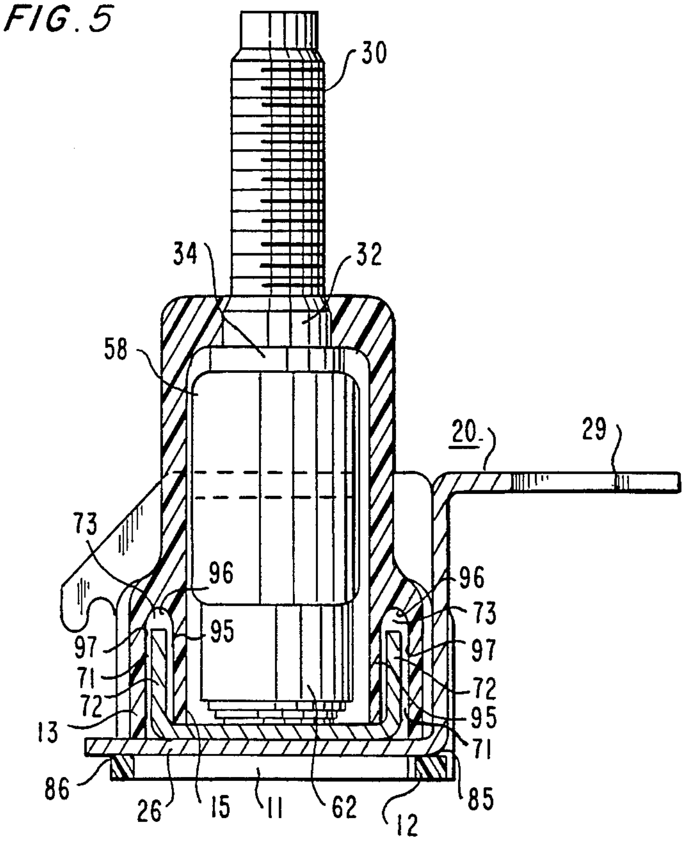

Referring to FIGS. 4 and 5, there are shown an elevation view in section of protector module 10 and an end view in section of protector module 10. The base of the housing defines outer wall 97 and inner wall 95 which meet at a point 96 below landing 18. Rim 72 of cup 70 is received into the space between the aforesaid walls 95 and 97. Thus rim 72 when received between housing walls 95 and 97 leaves, respectively, space 73. When potting compound is poured over tines 22, 24 and 26 of ground clip 20 and over base cup 70 within space 11 of base 12, the potting compound will enter the space between wall 97 and base cup 70, travel past area 96 over rim 72 of base cup 70 and enter space 73 between base cup 70 and wall 95 to a limited level and seal the protector module from the entry of moisture or contaminants therein. An important aspect of this invention is the tight fits between studs 36 and 46 and inner surface of wells 14 and 16 which promote a positive pressure within the enclosure, preventing potting compound from flowing over inner wall 95 and interfering with movement of moving parts within the enclosed volume. The use of potting compound to seal base 12 of protector module 10 insures that the mechanism therewithin will be protected from corrosion, contaminants, and moisture.

Figure 6:
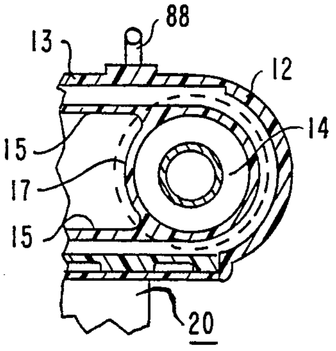

Referring to FIG. 6, there is shown a plan view in section taken along a plane through protector module 10 of FIG. 5. This section shows details of the housing for well 14 with the terminal, protector unit, and volute spring removed. The outer wall 13 and the inner wall 15 of base 12 are seen defining a cavity which receives rim 72 of base cup 70 (not shown in FIG. 6). The opening through the closed end of well 14 can be seen.

Figure 7:
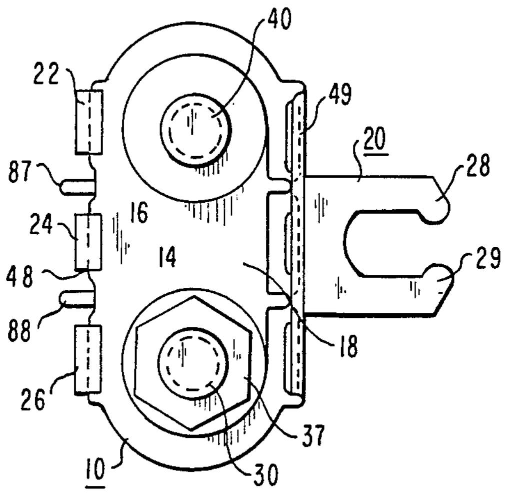

Referring to FIG. 7, there is shown a plan view of protector module 10, as seen from the top. Shanks 40 and 30 of terminals 46 and 36 are within wells 16 and 14, respectively. Nut 37 is seen secured to terminal shank 30. Wells 16 and 14 are separated by landing 18. Wall 48 of the housing defines catches 87 and 88. Projecting from wall 49 is grounding clip 20. Tines 22, 24 and 26 project from wall 48.

Figure 8:
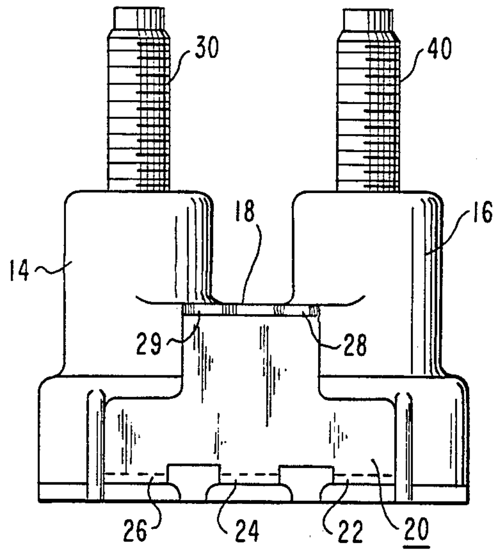

Referring to FIG. 8, there is shown an elevation view of protector module 10. There is shown ground clip 20 with tines 22, 24 and 26 penetrating through the walls of the housing near base 12. Forks 28 and 29 are seen at substantially the same level as landing 18. Wells 14 and 16 are seen projecting from base 12 with shank 30 of terminal 36 and shank 40 of terminal 46. The objective achieved by having wells 14 and 16 projecting above landing 18 is to increase the surface distance between the two terminals 36 and 46. This increase in distance between terminals 36 and 46 has a desirable effect of increasing the resistance therebetween especially in a moist environment. The raised terminals 36 and 46 provide a long leakage path therebetween for minimizing circuit noise.

Referring to FIG. 9, there are shown two protector modules 10 and 130 secured to binding post 112 of adaptor 100. It can be seen that ground connector 124 and ground conductor 121 are secured to binding post 112 by nut 117. Connector 124 connects ground sheath of service cable 127 to ground conductor 121 and binding post 112. Tip conductor 67 and ring conductor 63 from service cable, or drop wires, 127 are connected to terminal shanks 40 and 30, respectively. House wires from telecommunications equipment (not shown) comprising tip conductor 69 and ring conductor 65 are connected, respectively, to terminal shanks 40 and 30. Likewise, the corresponding tip and ring service and house cables are terminated at protector module 130.

Adaptor 100 is seen to be secured to enclosure 120 via screw 105. Enclosure 120 itself is secured by means not shown in FIG. 9 to a suitable support such as a wall. Enclosure 120 has a cover, not shown in FIG. 9, for protecting the components.

Figure 10:
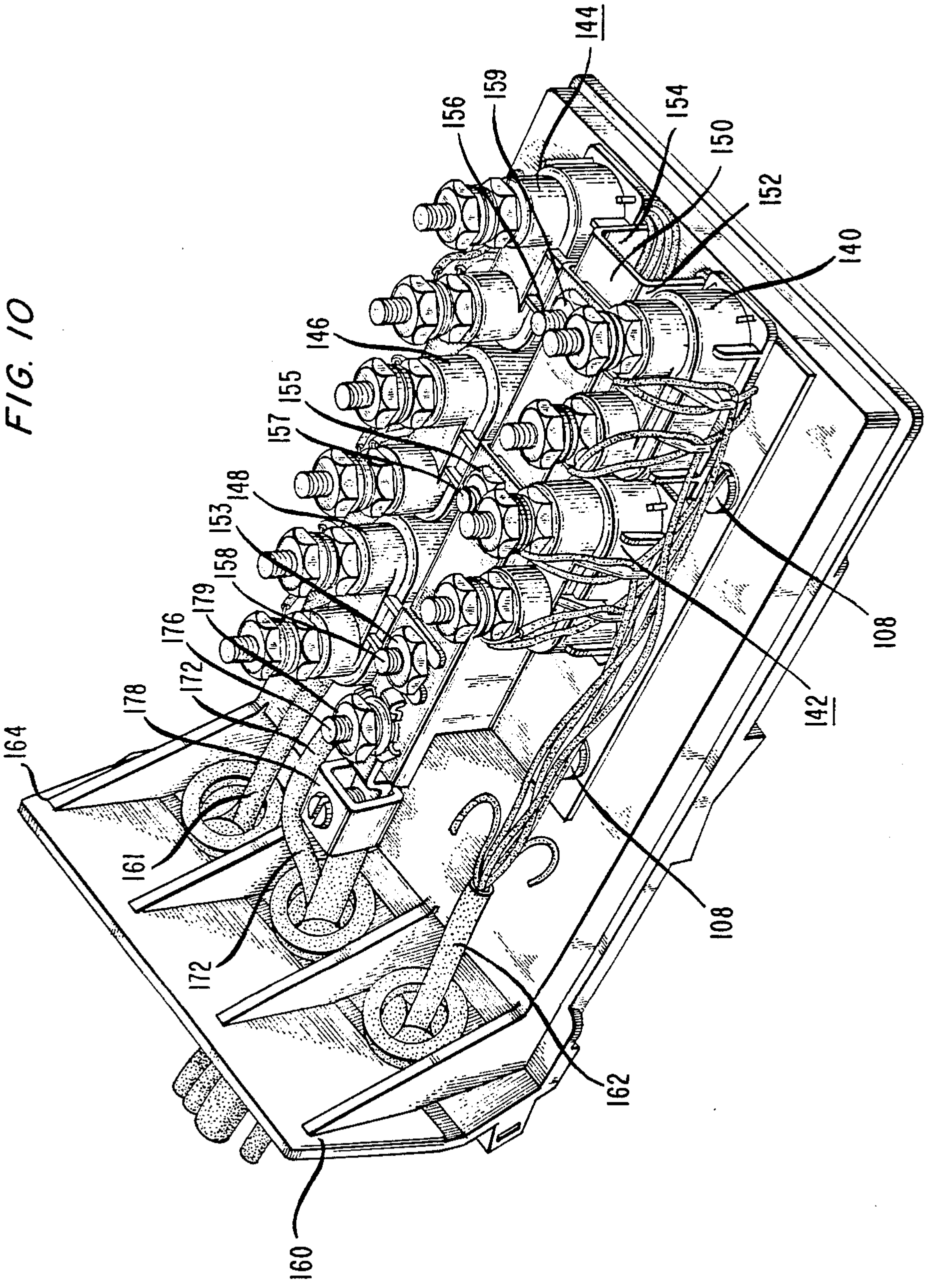
FIGS. 10 and 11 show two different assemblies, each having more than two protector modules.

Referring to FIG. 10, there is shown another type of enclosure 160 comprising an elongated adaptor 150. Adaptor 150 has sides 152 and 154 substantially vertical to the elevated central section and lower side section with two mounting holes. Adaptor 150 which is made from a good conductor like brass has two openings through which two screws 108 may be introduced to secure it to enclosure 160.

Adaptor 150 also has a plurality of openings through which binding posts 156, 157 and 158 are introduced. These binding posts perform the same function as binding post 112 of FIG. 1 except that they are all interconnected through the adapter. Protector modules 140 and 144 are secured through their ground clips, similar to ground clip 20 of FIG. 1, to binding post 156 with nut 159. Likewise, ground clips of protector modules 142 and 146 are secured to binding post 157 with nut 155. There is shown yet another protector module 148 secured by way of its ground clip to binding post 158 with nut 153.

The house conductors and service conductors are terminated in the same manner as disclosed hereinbefore with reference to FIG. 9. The sheath of the service cable is connected to adapter 150 with clamp 178 and thence to ground conductor 172 through binding post 176 and nut 179. The cover for enclosure 160 is not shown in FIG. 10.

Figure 11:
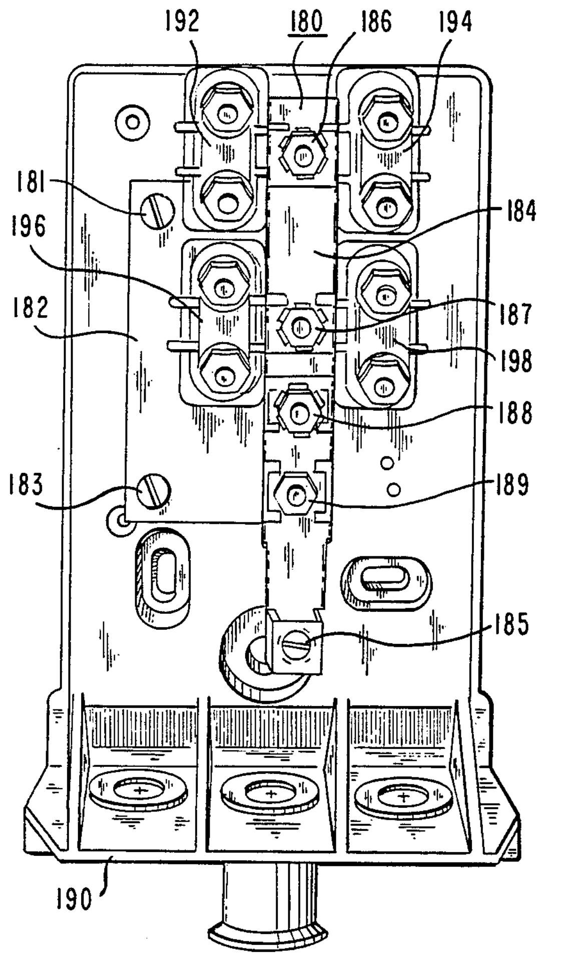

Referring to FIG. 11, there is shown an embodiment of an enclosure which is similar to that of FIG. 10. Adaptor 180 of FIG. 11, is different from adaptor 150 of FIG. 10. Adaptor 180 is formed from a sheet of metal which is a good conductor and has a flat surface 182, a central elongated piece 184 one side of which is connected to flat surface 182 by a vertical wall and the other side of which is also a vertical wall which rests on enclosure 190. Flat surface 182 of adaptor 180 is secured to enclosure 190 by two screws 181 and 183. Central piece 184 has a plurality of apertures through which a plurality of studs 186, 187, 188 and 189 are inserted so that a plurality of protectors 192, 194, 196 and 198 are connected by way of their ground clips such as element 20 of FIG. 1. End 185 of adaptor 180 is used to connect the sheath of a cable.

What is claimed is:

1. Apparatus for protecting equipment connected to a telephone line and for protecting persons using said equipment against spurious voltages and spurious currents said apparatus comprising (1) a housing, said housing comprising a base, a landing, first and second wells between said base and said landing, each of said wells having an end elevated above said landing by a predetermined height and an opening through each end, the base of said housing having a trough surrounding the interior walls of said wells, (2) first and second terminals, said terminals housed within said first and second wells, respectively, said terminals forming a substantially air tight seal with said ends, and said terminals projecting through said openings, (3) first and second protectors introduced through an opening in said base and housed within said first and second wells respectively and communicating with said first and second terminals, (4) first and second springs communicating with said first and second protectors, (5) a base cup, said base cup substantially covering said open base and retaining said first and second springs in said first and second wells respectively said base cup lodged within said trough, trapping an air pocket within said housing and forming a substantial seal with said housing, and (6) means for grounding said spurious signals from said first and second terminals, said grounding means comprising a plurality of tines, said tines retaining said base cup in position by penetrating apertures in opposite walls of said housing to form a tight seal, said grounding means further comprising means for securing said grounding means to a binding post of an adaptor.

2. The apparatus of claim 1 wherein said base cup and said tines within said base are covered with a potting compound to prevent contaminants from entering said protector unit, said seal between said walls and said tines preventing said potting compound from leaking from said base, and the air pocket trapped within said housing preventing said potting compound from entering said protector units.

3. The apparatus of claim 2 wherein said spring is a volute spring, said volute spring providing a high current carrying capacity.

4. The apparatus of claim 2 wherein said protector comprises a pellet, said pellet being an alloy having a predetermined melting point range, a surge arrester, said surge arrester becoming conductive above a predetermined voltage level, and a drawn brass cup, said drawn brass cup housing said pellet and said surge arrester.

5. The apparatus of claim 2 wherein said housing comprises means for securing one or more conductors to said housing after said conductor has been terminated at said terminals.

6. The apparatus of claim 5 wherein said housing is made from glass filled polybutylene terephthalate.

7. The apparatus of claim 2 wherein each of said terminals comprises a knurled for being retained within said housing.

8. The apparatus of claim 7 wherein each of said terminals comprises a first means for terminating either a tip conductor or a ring conductor of a telephone drop wire, and a second means for terminating one or more corresponding tip or ring conductors to be connected to telecommunications equipment.

9. The apparatus of claim 2 wherein said apparatus is secured to an adaptor, said adaptor comprising a central section and two flanges, said two flanges connected to said central section by two walls respectively, said central section being raised above said two flanges, said central section defining an opening for receiving said binding post, said two flanges comprising means for securing said adaptor to a support for said apparatus, and said binding post comprising (a) a threaded brass mounting post and a brass nut for securing one or two of said protector units, and (b) a pronged washer, a plurality of flat washers and a second nut for terminating one or more conductors connected to ground potential.

10. The apparatus of claim 2 wherein said base cup is made from material having high electrical conductivity.

11. A modular telephone line protector for conveying surge voltages and fault currents to ground, said line protector comprising (1) a housing shell comprising an open base and a closed end, a plurality of wells between said open base and said closed end, said closed end defining an orifice with each of said wells, the open base having a trough surrounding said wells, each well having a top end, the top ends of said wells being raised above said base so that the surface distance between any two of said terminals within said wells exceeds a predetermined distance.

(2) each of said wells comprising in series (a) a terminal, said terminal projecting through said orifice and used for terminating conductors, said terminal forming a substantially air tight seal with said top end, (b) a protector, and (c) a volute spring (3) a cup retaining said volute spring and said protector against said terminal within each of said wells, said cup fitting within said trough and substantially covering said open base, and a grounding clip, said grounding clip comprising means for retaining said base cup within said trough of said open base of said housing shell, said means for retaining said base cup forming a substantial seal with said housing shell, said grounding clip further comprising means for securing said protector to a conductor terminating means of an adaptor.

12. The modular protector of claim 11 wherein said cup and said means for retaining said cup within said trough are covered with a potting compound to prevent contaminants from entering said protector, an air pocket trapped within said housing shell preventing said potting compound from entering said housing.

13. The modular protector of claim 12 wherein said conductor terminating means of said adapter comprises (1) an elongated metallic bar having a central section and two side sections, said two side sections being substantially perpendicular to said central section, said central section having a first plurality of openings and a second plurality of openings, said first plurality of openings being used to receive means for securing said elongated metallic bar to a surface.

(2) a plurality of conductive, metallic binding posts housed within said second plurality of openings, each of said binding posts comprising a threaded brass mounting post and a brass nut for securing one or two of said ground clips, and (3) means for conducting spurious signals from said elongated metallic bar to ground potential.

14. The modular protector of claim 12 wherein said housing shell comprises a plurality of means for securing one or more conductors adjacent to said housing shell.

15. The modular protector of claim 12 wherein said housing shell is made from glass filled polybutylene terephthalate.

16. The modular protector of claim 12 wherein said terminal comprises a knurled shoulder fitting tightly within said top end of said well.

17. The modular protector of claim 12 wherein said protector comprises a gas tube, said gas tube designed to conduct above a predetermined voltage.

18. The modular protector of claim 12 wherein said adaptor further comprises a flat surface having a plurality of apertures through which means for securing said adaptor to a support may be introduced, an elongated section connected to said flat surface and elevated therefrom by a substantially vertical wall, said elongated section adapted to receive a plurality of studs, each of said studs being used to secure at least one of said protector, and means for connecting said adaptor to ground.

19. An improved station protector for conveying spurious voltages and spurious currents in a telephone line to ground potential, said protector comprising a housing having a base, a landing and first and second wells between said base and said landing, each well having an end with an aperture and a terminal projecting through said aperture, first and second protectors, respectively, lodged in said first and second wells, and first and second resilient means urging, respectively, said first and second protectors against said terminals, the improvement comprising said terminals forming a substantially air tight seal with the end of said wells, said ends of said first and second wells being elevated above said landing so that the distance between said two ends measured along the height of each well above the landing and the length along the landing between the two wells exceeds a predetermined value, said base having a trough open to the atmosphere and surrounding said first and second wells, a base cup substantially closing said open trough and lodged within said trough said base cup making contact with said first and second resilient means, and retaining means penetrating a pair of side walls of said base to retain said base cup within said trough.

20. The protector of claim 19 wherein said retaining means comprises first and second substantially parallel ends separated by a vertical member, said vertical member lying along a side wall of said housing, said second end having means for securing said protector to an adaptor, said retaining means also conveying spurious voltages and currents to ground potential via said adaptor, said second end directed away from said housing.

21. The protector of claim 20 wherein said base cup and retaining means is sealed with a potting compound, a pocket of air trapped within the housing preventing the potting compound from entering said first and second wells.

22. The protector of claim 21 wherein one of the side walls of the housing has means for securing conductors that are terminated on said first and second terminals.

23. A modular telephone line protector for conveying surge voltages and fault currents to ground, said line protector comprising (1) a housing shell comprising an open base and a closed end, a plurality of wells projecting from said closed end, the open base providing a trough surrounding said wells, each well having a top end, a terminal housed within each well, the top ends of said wells being raised above said base so that the surface distance between any two of said terminals within said wells exceeds a predetermined distance.

(2) each of said wells enclosing in series (a) said terminal projecting through the top end of said well and used for terminating conductors, said terminal forming a substantially air tight seal with said top end of said well, (b) a protector, (c) a spring communicating with said protector, (3) a cup retaining said spring and said protector against said terminal within each of said wells, said cup fitting within said trough and substantially covering said open base, and means including a grounding clip for retaining said cup within said trough of the open base of said housing shell, said cup when retained by said retaining means forming a substantial seal with said housing shell, said grounding clip comprising means for securing said line protector to a conductor terminating means.

24. An improved station protector for conveying spurious voltages and spurious currents in a telephone line to ground potential, said station protector comprising a housing having a base, a landing and first and second wells projecting from said landing, each well having a top end with an aperture therein and a terminal projecting through the top end aperture, first and second protectors, respectively, lodged in said first and second wells, and first and second resilient means urging, respectively, said first and second protectors against said terminals, said terminals forming a substantially air tight seal with the apertured ends of said wells, said apertured ends of said first and second wells being elevated above said landing so that the distance between said two apertured ends measured along the height of each well above the landing and the length along the landing between the two wells exceeds a predetermined value, said base providing a trough open to the atmosphere and surrounding said first and second wells, base cup means substantially closing said open trough and lodged within said trough, said base cup means making contact with said first and second resilient means, and retaining means penetrating said base to retain said base cup means within said trough.

* * * * *